Aug. 5, 1924.
1,503,994
H. F. PENNEY
COMBINATION THERMOMETER AND OVEN DOOR HANDLE
Filed June 26, 1923
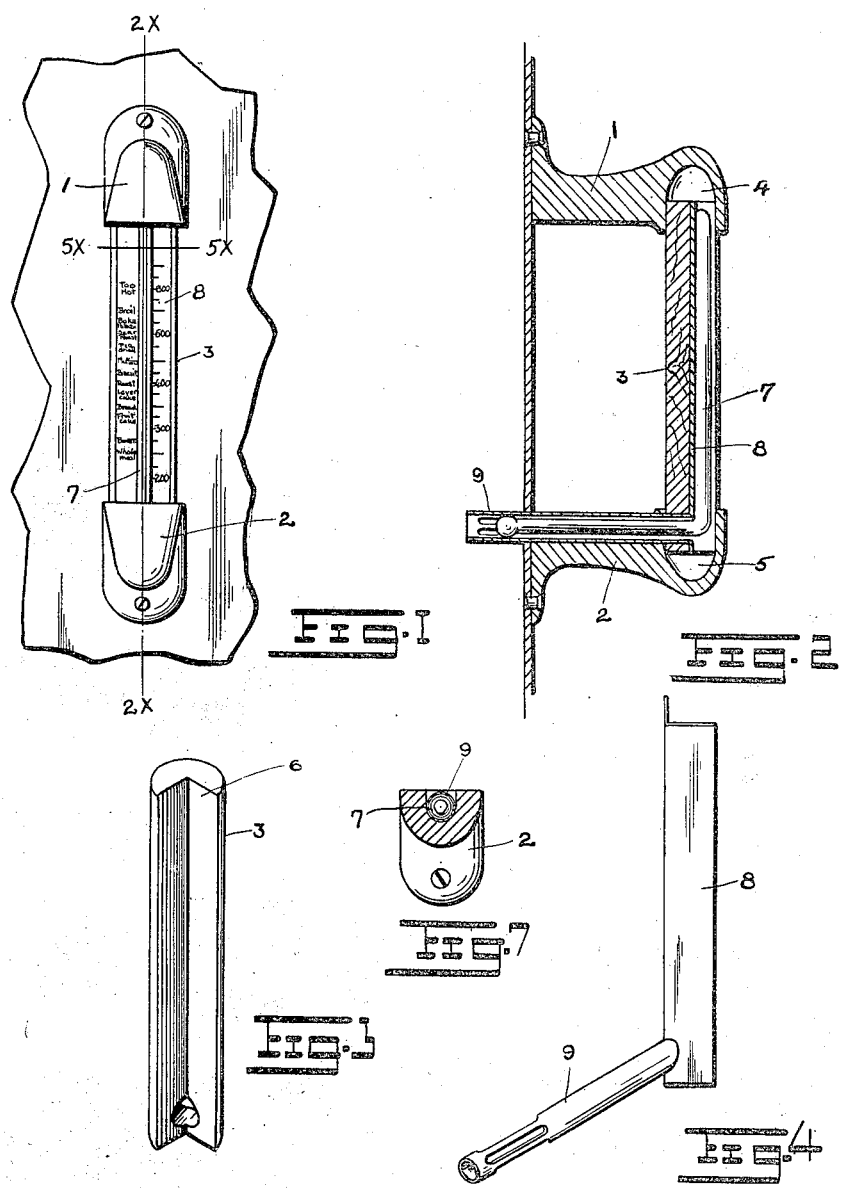
INVENTOR
Harold F. Penney
BY
Frank Keipper
ATTORNEY Patented Aug. 5, 1924.

1,503,994

UNITED STATES PATENT OFFICE.

HAROLD F. PENNEY, OF GENEVA, NEW YORK, ASSIGNOR TO PHILLIPS & CLARK STOVE CO. INC., OF GENEVA, NEW YORK, A CORPORATION OF NEW YORK.

COMBINATION THERMOMETER AND OVEN-DOOR HANDLE.

Application filed June 26, 1923. Serial No. 647,910.

*To all whom it may concern:*

Be it known that I, HAROLD F. PENNEY, a citizen of the United States, residing at Geneva, in the county of Ontario and State of New York, have invented certain new and useful Improvements in Combination Thermometers and Oven-Door Handles, of which the following is a specification.

The object of this invention is to provide a combination handle and thermometer mounting for oven doors.

This and other objects of this invention will be fully illustrated in the drawing, described in the specification and pointed out in the claims at the end thereof.

In the accompanying drawing:

Figure 1 is a front elevation of the handle and the thermometer mounted therein.

Figure 2 is a vertical sectional view of the handle showing the mounting of the thermometer therein.

Figure 3 is a detail perspective view of the handle section proper of the combination handle and thermometer.

Figure 4 is a perspective view of the thermometer mounting embedded in the handle.

Figure 5 is a horizontal sectional view of the handle, the section being taken on the line 5×—5× of Figure 1.

Figure 6 is a similar sectional view showing a slightly modified form of thermometer mounting for the handle.

Figure 7 is a vertical sectional view through the lower supporting bracket of the handle.

In the several figures of the drawing like reference numerals indicate like parts.

In cooking ranges the degree of heat in the oven whether it is heated by coal or gas varies and its regulation is, therefore, very vital to the performance of the oven. For this reason such ovens are equipped with a suitable thermometer or pyrometer that indicates at all times the temperature on the inside of the oven while baking or cooking is being done therein. Only in this way the heat applied to the oven can be regulated intelligently to maintain the desired heat necessary for the particular cooking or baking process.

While thermometers and pyrometers have been applied to ovens of cooking ranges for this purpose long before this, the combination handle and thermometer support forming the subject matter of my present invention combines such a thermometer with the handle of the oven in a manner that gives the thermometer a good support at a very desirable location. In this position it indicates the degree of heat in the part of the oven which gives accurate indication for the whole oven. It also forms a guard around the thermometer that protects it against damage.

As illustrated in the figures this is done by making the handle in three parts, an upper and lower bracket 1 and 2 and the handle section 3. The brackets 1 and 2 are preferably cast of metal or possibly bent up of sheet iron while the upright handle section 3 is formed of wood or other non-conductor of heat. The brackets 1 and 2 are fastened to the door of the oven and are provided with the pockets 4 and 5 at the outer ends thereof. The upper and lower ends of the upright handle section 3 extend into these pockets and are supported therein to complete the handle for the door.

The front of the upright wooden handle section 3 is channeled out to form a V shaped channel 6 in which is placed a V shaped piece of metal 8 on which is marked an indicator scale. This indicator scale has an opening in the bottom thereof from which extends a rearwardly extending tube 9. The thermometer 7 is supported on this scale. The thermometer tube is bent to an L shape. The mercury bulb is at the rear end of the lower horizontal part and when the door is closed projects into the oven. It is protected by the tube 9 which at the rear end is slotted to permit the air of the oven to freely circulate around the bulb, so that the mercury contained therein will be quickly affected by any fluctuation in the temperature in the oven.

The graduations and temperatures fixed for cooking and baking are indicated on the sides of the channel 8 and can be readily observed by any one using the oven. It will be seen that by combining the handle of the oven with the thermometer in the manner illustrated and described the handle of the oven, without impairing its usefulness, forms a very efficient support for the thermometer in a location that otherwise could not be used for the mounting thereof. It also protects the thermometer against damage in that the handle section 3 forms a guard around three sides of the thermometer leaving only the front of the thermometer and its graduations exposed for observation only.

I claim:

1. A combination handle and thermometer mounting, comprising a pair of supporting brackets, a handle section supported by said supporting brackets there being a channel formed in said handle section and a thermometer having its reading stem mounted in the channel of said handle section and its bulb portion projecting rearwardly through the door adjacent to one of the brackets on which the combination handle is mounted.

2. A combination handle and thermometer mounting, comprising a pair of supporting brackets, a handle section supported by said supporting brackets, there being a channel formed in said handle section and a thermometer having its reading stem mounted in the channel of said handle section and its bulb portion projecting rearwardly through the door adjacent to one of the brackets on which the combination handle is mounted, there being a graduated scale marked on the wall of the channel of said handle section.

3. A combination handle and thermometer mounting, comprising a pair of supporting brackets, a handle section supported by said supporting brackets there being a channel formed in said handle section and a thermometer having its reading stem mounted in the channel of said handle section and its bulb portion projecting rearwardly through the door adjacent to one of the brackets on which the combination handle is mounted, a graduated metal channel mounted in the channel of said handle section behind said thermometer, a tubing projecting rearwardly from said metal channel, said tubing surrounding the rearwardly projecting portion of said thermometer, said tubing having openings near the end thereof to allow free circulation of the heated air around the end of said thermometer.

4. A combination handle and thermometer mounting, comprising a handle section, a bracket for supporting said handle section, a thermometer supported by said handle section, a portion of said thermometer being mounted in front of said handle section and the end portion of said thermometer projecting rearwardly through said handle section and through the oven door.

In testimony whereof I affix my signature.

HAROLD F. PENNEY.